United States Patent
Park et al.

(10) Patent No.: US 10,568,135 B2
(45) Date of Patent: Feb. 18, 2020

(54) METHOD FOR CHANNEL SENSING IN WIRELESS COMMUNICATION SYSTEM AND APPARATUS THEREFOR

(71) Applicant: LG ELECTRONICS INC., Seoul (KR)

(72) Inventors: Hanjun Park, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/573,060

(22) PCT Filed: May 12, 2016

(86) PCT No.: PCT/KR2016/005018
§ 371 (c)(1),
(2) Date: Nov. 9, 2017

(87) PCT Pub. No.: WO2016/182369
PCT Pub. Date: Nov. 17, 2016

(65) Prior Publication Data
US 2018/0115992 A1    Apr. 26, 2018

Related U.S. Application Data

(60) Provisional application No. 62/161,221, filed on May 13, 2015.

(51) Int. Cl.
*H04W 74/08*    (2009.01)
*H04W 16/14*    (2009.01)
*H04W 72/12*    (2009.01)

(52) U.S. Cl.
CPC ....... *H04W 74/0808* (2013.01); *H04W 16/14* (2013.01); *H04W 72/1278* (2013.01)

(58) Field of Classification Search
CPC ............ H04W 16/14; H04W 72/1278; H04W 74/0808
See application file for complete search history.

(56) References Cited

U.S. PATENT DOCUMENTS

| 2013/0051358 A1 | 2/2013 | Turtinen et al. |
| 2015/0049709 A1 | 2/2015 | Damnjanovic et al. |

(Continued)

FOREIGN PATENT DOCUMENTS

| KR | 10-2013-0133204 A | 12/2013 |
| WO | WO 2014/189912 A1 | 11/2014 |

*Primary Examiner* — Khaled M Kassim
*Assistant Examiner* — Thomas R Cairns
(74) *Attorney, Agent, or Firm* — Birch, Stewart, Kolasch & Birch, LLP

(57) ABSTRACT

One embodiment of the present invention relates to a method for channel sensing within an unlicensed band in a wireless communication system. The method is performed by a transmission node which performs the channel sensing, and may comprises the steps of: receiving, from a control node, a control signal including data transfer indication; receiving, from the control node, an indicator indicating an interval at which a channel-sensing related operation associated with the data transfer indication is performed; and performing the channel-sensing related operation for a length of time corresponding to the indicator before a data transfer start time according to the data transfer indication, or, on the basis of the time at which the control signal is received, from after a length of time corresponding to the indicator, until before the data transfer start time according to the data transfer indication.

13 Claims, 11 Drawing Sheets

(56) References Cited

U.S. PATENT DOCUMENTS

| | | | |
|---|---|---|---|
| 2015/0103777 A1 | 4/2015 | Chen et al. | |
| 2016/0021661 A1* | 1/2016 | Yerramalli | H04W 16/14 370/329 |
| 2016/0212764 A1* | 7/2016 | Yin | H04W 74/002 |
| 2016/0212767 A1* | 7/2016 | Yin | H04W 24/08 |
| 2016/0278088 A1* | 9/2016 | Cheng | H04L 47/27 |
| 2016/0295611 A1* | 10/2016 | Yin | H04L 5/00 |
| 2017/0019909 A1* | 1/2017 | Si | H04L 47/27 |
| 2017/0339721 A1* | 11/2017 | Mukherjee | H04W 16/14 |
| 2018/0014326 A1* | 1/2018 | Wang | H04L 1/1812 |

* cited by examiner

METHOD FOR CHANNEL SENSING IN WIRELESS COMMUNICATION SYSTEM AND APPARATUS THEREFOR

CROSS REFERENCE TO RELATED APPLICATIONS

This application is the National Phase of PCT International Application No. PCT/KR2016/005018, filed on May 12, 2016, which claims priority under 35 U.S.C. 119(e) to U.S. Provisional Application No. 62/161,221, filed on May 13, 2015, all of which are hereby expressly incorporated by reference into the present application.

TECHNICAL FIELD

The present invention relates to a wireless communication system, and more particularly, to a method of performing channel sensing in an unlicensed band and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

A technical task of the present invention is to propose a method of performing channel sensing in an unlicensed band.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing channel sensing, which is performed by a transmitting node in an unlicensed band in a wireless communication system, includes the steps of receiving a control signal including a data transmission indication from a control node, receiving an indicator indicating a section in which a channel sensing-related operation associated with the data transmission indication is performed from the control node, and performing the channel sensing-related operation during a length of time corresponding to the indicator before data transmission start timing according to the data transmission indication or during time after the length of time corresponding to the indicator from timing at which the control signal is received before the data transmission start timing according to the data transmission indication.

Additionally or alternatively, the channel sensing-related operation may include at least one of performing a back-off counter-based initial CCA (clear channel assessment), an operation of performing a back-off counter-based ECCA (extended CCA), or an operation of transmitting a reservation signal.

Additionally or alternatively, the indicator indicating the section in which the channel sensing-related operation is performed may be included in the control signal.

Additionally or alternatively, the indicator indicating the section in which the channel sensing-related operation is performed may be received by higher layer signaling.

Additionally or alternatively, the method may further include receiving an indication indicating whether or not a reservation signal is transmitted from the control node.

Additionally or alternatively, the method may further include receiving a second indicator indicating a section in which transmission of a reservation signal is permitted from the control node. In this case, the section in which the transmission of the reservation signal is permitted may include a length of time corresponding to the second indicator before data transmission start timing according to the data transmission indication or a length of time after the length of time corresponding to the second indicator from timing at which the control signal is received before the data transmission start timing according to the data transmission indication.

Additionally or alternatively, the length of time corresponding to the second indicator may correspond to a fixed length of time.

Additionally or alternatively, if the data transmission indication indicates data transmission during a plurality of scheduling units, each of a plurality of the scheduling units may include a time frequency resource not performing the data transmission.

Additionally or alternatively, the time frequency resource not performing the data transmission may be used for a channel sensing-related operation of other nodes.

Additionally or alternatively, if the data transmission indication indicates data transmission during a plurality of scheduling units, each of a plurality of the scheduling units may include a time resource in which the transmitting node configured by the control node transmits a known signal.

Additionally or alternatively, the time resource in which the transmitting node transmits the known signal may be used for a channel sensing-related operation of other nodes.

Additionally or alternatively, the control signal may further include information indicating whether or not the channel sensing-related operation is initialized.

Additionally or alternatively, the information indicating whether or not the channel sensing-related operation is initialized may be used for simultaneous transmission with other UEs.

Additionally or alternatively, if it fails to perform the data transmission indicated by the data transmission indication according to a result of the channel sensing, the method may further include initializing the channel sensing-related operation.

To further achieve these and other advantages and in accordance with the purpose of the present invention, according to a different embodiment, a node configured to perform channel sensing in an unlicensed band in a wireless communication system includes an radio frequency (RF) unit and a processor that controls the RF unit, the processor controls the RF unit to receive a control signal including a data transmission indication from a control node, controls the RF unit to receive an indicator indicating a section in which a channel sensing-related operation associated with the data transmission indication is performed from the control node, performs the channel sensing-related operation during a length of time corresponding to the indicator before data transmission start timing according to the data transmission indication or during time after the length of time corresponding to the indicator from timing at which the control signal is received before the data transmission start timing according to the data transmission indication.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently perform channel sensing in an unlicensed band.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
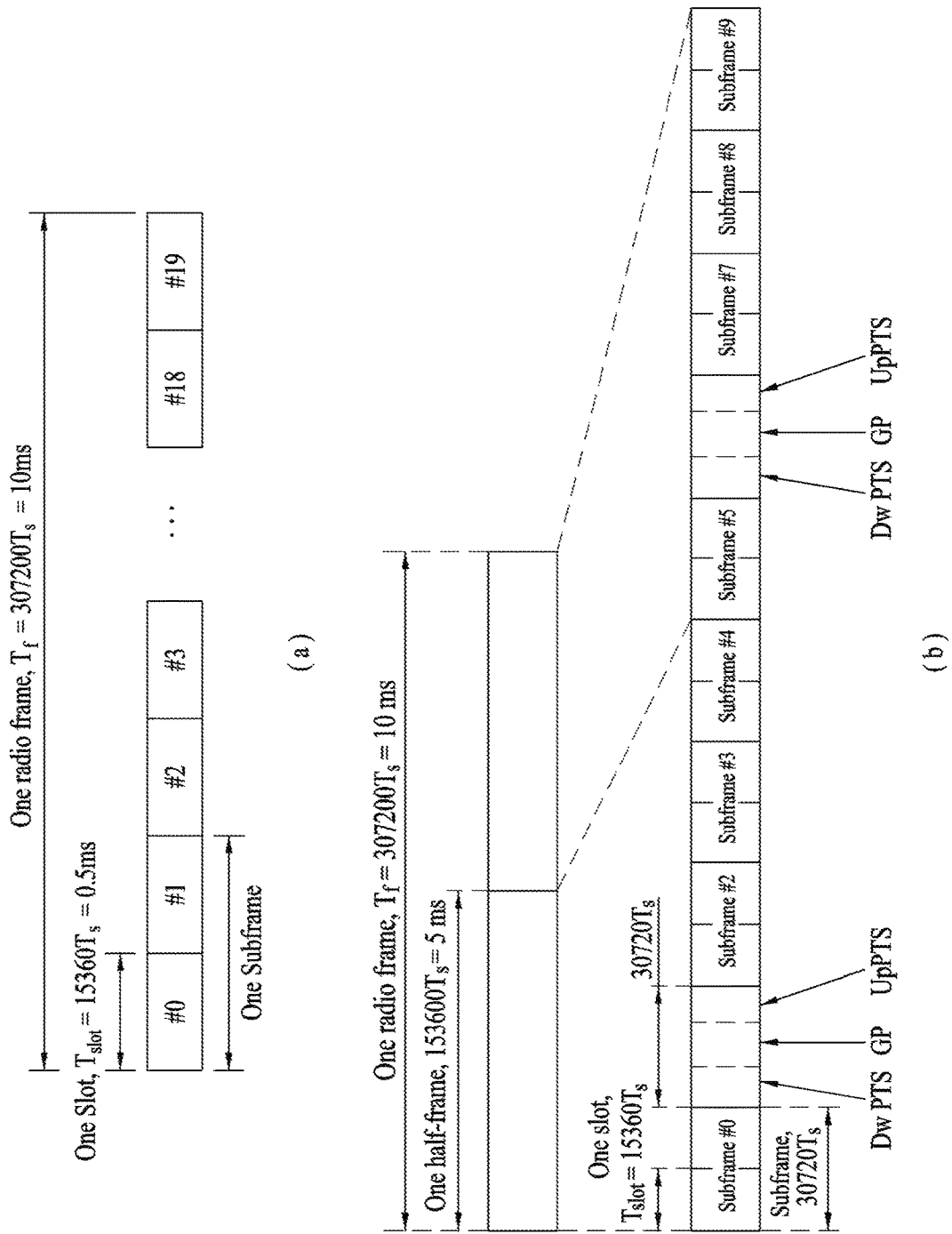
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
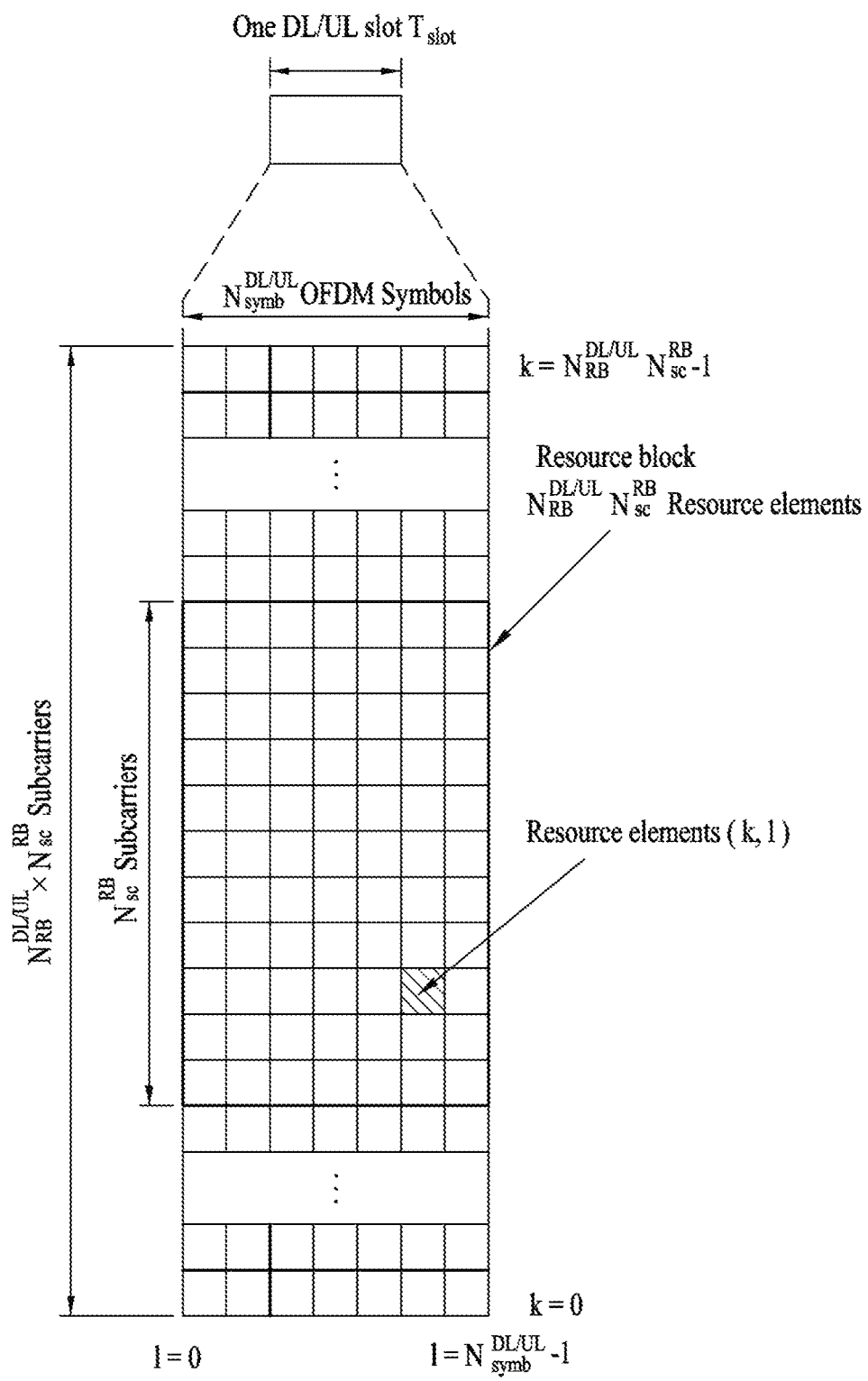
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} \ast N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} \ast N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} \ast N_{sc}^{RB}$ REs. Each RE in a resource grid can be uniquely defined by an index pair (k, l) in a slot. Here, k is an index in the range of 0 to $N_{symb}^{DL/UL} \ast N_{sc}^{RB} - 1$ in the frequency domain and l is an index in the range of 0 to $N_{symb}^{DL/UL} - 1$.

Two RBs that occupy $N_{sc}^{RB}$ subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
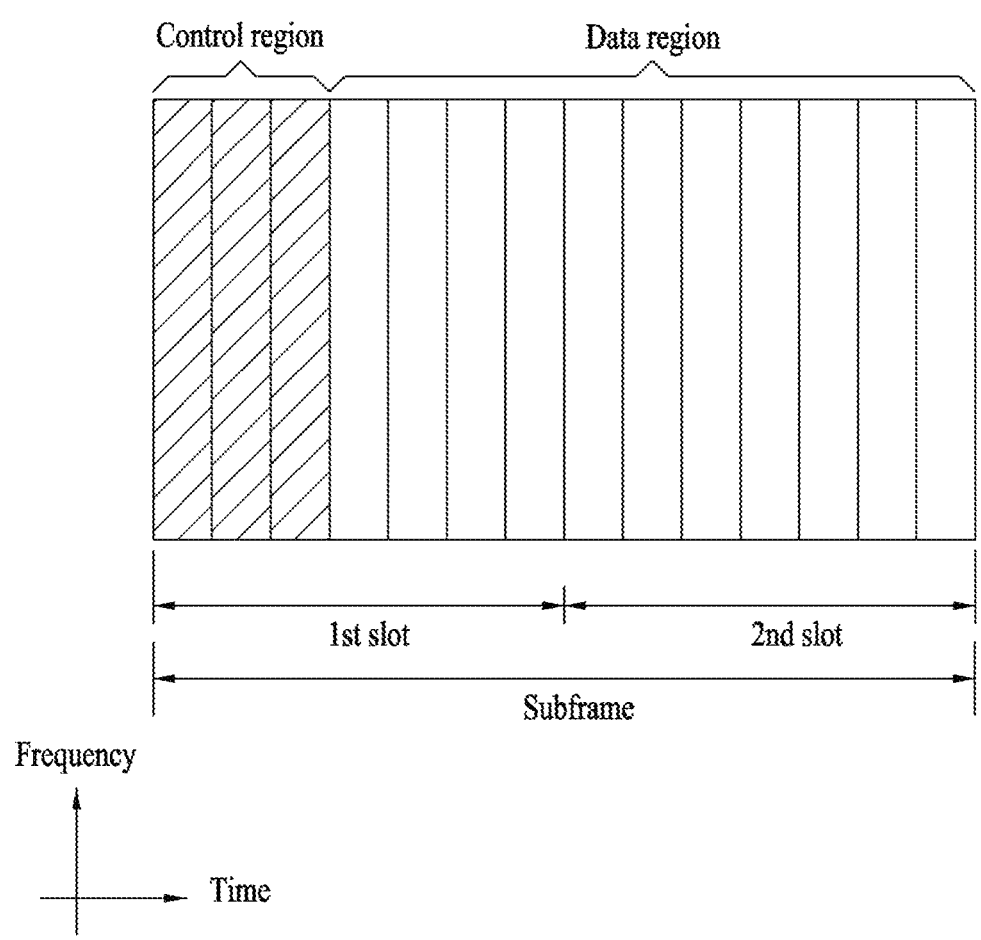
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |

TABLE 3-continued

| Type | Search Space | | Number of PDCCH candidates $M^{(L)}$ |
|---|---|---|---|
| | Aggregation Level L | Size [in CCEs] | |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
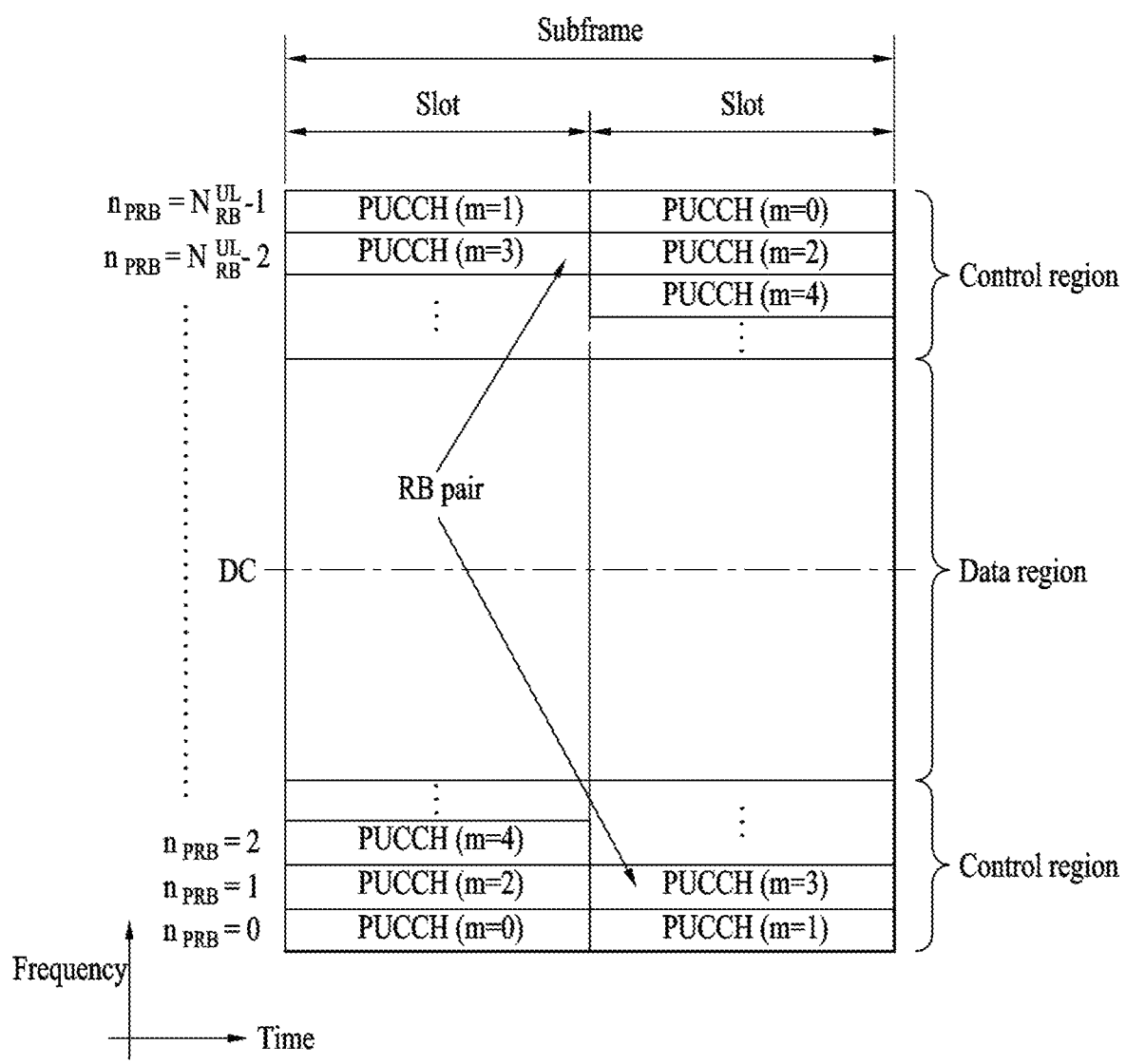
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Recently, with the advent of a smart device, data traffic is considerably increasing. As a result, a next generation wireless communication system such as 3GPP LTE-A is trying to find ways to efficiently utilizing a limited frequency band. In particular, the next generation wireless communication system considers managing a cellular network on such an unlicensed band as 2.4 GHz or 5 GHz.

Since an unlicensed band basically assumes a scheme of having wireless transmission and reception opportunity via contention between communication nodes, it is required for each communication node to perform such a work as channel sensing before a signal is transmitted to check whether or not a signal is transmitted by a different communication node. For clarity, the above-mentioned operation is referred to as LBT (listen before talk). In particular, the operation of checking whether or not a different node transmits a signal is defined as CS (carrier sensing) or CCA (clear channel assessment). If it is determined as a different transmitting node does not transmit a signal based on a result of the CCA, it is defined as a channel unoccupied state. Otherwise, it is defined as a channel occupied state. In LTE system, it is necessary for an eNB or a UE to perform the LBT to transmit a signal on an unlicensed band. When the eNB or the UE transmits a signal in the LTE system, it is necessary for other communication nodes such as Wi-Fi to perform the LBT not to cause any interference. For example, a CCA threshold is regulated by −62 dBm for a non-WiFi signal and −82 dBm for a WiFi signal, respectively, in WiFi standard (e.g., 802.11ac). For example, if a signal other than WiFi signal is received with power equal to or greater than −62 dBm, an STA or an AP does not transmit a signal in order not to cause any interference.

Figure 5:
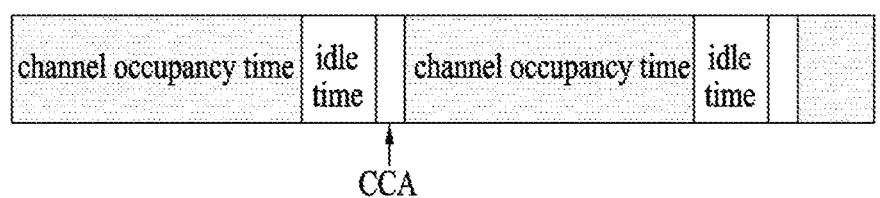
FIG. 5 is a diagram for an example of an LBT (listen before talk)-based channel access operation according to a FBE (frame based equipment)

For example, regulation of Europe illustrates two types of LBT-based channel access operation respectively referred to as FBE (frame based equipment) and LBE (load based equipment). The FBE configures a single frame using channel occupancy time (e.g., 1~10 ms) corresponding to time capable of maintaining transmission when a communication node succeeds in accessing a channel and idle time corresponding to the minimum 5% of the channel occupancy time. The CCA is defined as an operation of observing a channel for at least 20 μs of the last part of the idle time. In this case, a communication node periodically performs the CCA in a unit of the frame. If a channel is unoccupied, the communication node transmits data during the channel occupancy time. If a channel is occupied, the communication node waits until a CCA slot of a next period while postponing transmission. FIG. 5 shows an example of the FBE operation.

Figure 6:
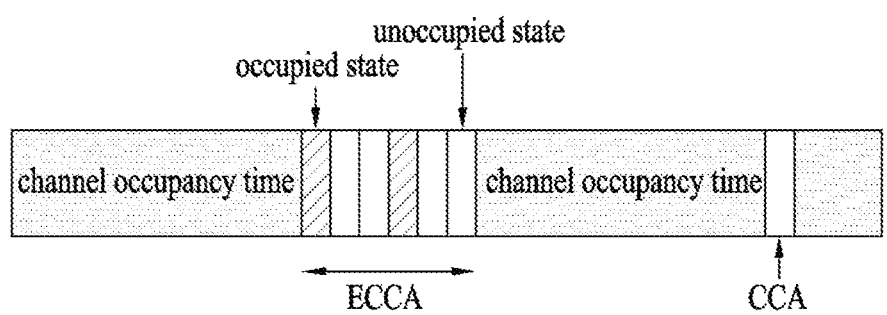
FIG. 6 is a diagram for an example of an LBT (listen before talk)-based channel access operation according to an LBE (load based equipment)

Meanwhile, in case of the LBE, a communication node configures a value of $q \in \{4, 5, \ldots, 32\}$ first and performs CCA on a single slot. If a channel is unoccupied in the initial CCA slot, the communication node can transmit data by securing channel occupancy time as much as a length of $(13/32)q$ ms. If a channel is occupied in the initial CCA slot, the communication node randomly selects a value of $N \in \{1, 2, \ldots, q\}$, stores the selected value as an initial value of a counter, and senses a channel state in a unit of a CCA slot. If a channel is unoccupied in a specific CCA slot, the communication node reduces the value stored in the counter by 1. If the value stored in the counter becomes 0, a user equipment (UE) can transmit data with channel occupancy time as much as a length of $(13/32)q$ ms. FIG. 6 shows an example of the LBE operation.

In the example, an occupied state of a channel or an unoccupied state of the channel can be determined based on whether or not reception power exceeds a prescribed threshold in a CCA slot. For example, according to the Wi-Fi standard (e.g., 801.11ac), a CCA threshold is regulated by −62 dBm and −82 dBm for a non-Wi-Fi signal and a Wi-Fi signal, respectively. In particular, if a signal rather than a Wi-Fi signal is received with power equal to or greater than −62 dBm, an STA (station) or an AP (access point) does not perform signal transmission to avoid interference occurrence.

Meanwhile, a wireless communication system such as 3GPP LTE-A, and the like, considers a method of combining a cell operating on a licensed band (hereinafter, L-cell) and a cell operating on an unlicensed band (hereinafter, U-cell) with each other using a CA (carrier aggregation) technique and an LAA (licensed assisted access) system performing LBT-based DL/UL transmission in the U-cell. When a heterogeneous system such as Wi-Fi and the like capable of being managed in an unlicensed band is considered, it is preferable to have an LBT operation capable of supporting a back-off operation (i.e., an operation of performing ECCA until a back-off counter becomes 0) and easily securing a channel at relatively random timing. For example, an LBE operation of the Europe regulation also supports an (incremental) back-off operation. Hence, the LBE operation can be considered as the LBT operation for the LAA system.

The LAA system inherits DL and UL structures from an LTE system. In particular, a DL transmitting node corresponds to a base station for a single U-cell in the aspect of the U-cell and a UL transmitting node may correspond to a terminal capable of performing UL transmission to the U-cell. In this case, since the base station corresponding to the DL transmitting node corresponds to a main entity of DL scheduling in DL, if the base station performs an LBT operation and knows that a channel is in an unoccupied state at random timing after CCA is performed, the base station is able to transmit DL data together with DCI (downlink control information) at the random timing or timing adjacent to the random timing. On the contrary, in case of UL, the user equipment corresponding to the UL transmitting node is unable to autonomously perform UL scheduling. The user equipment can transmit UL data at the timing promised with the base station in advance only after a UL grant corresponding to UL scheduling indication of the base station is received from the base station. Hence, although the user equipment determines that a channel is in an unoccupied state at specific timing via an LBT operation, if the user equipment fails to receive the UL grant indicating UL transmission at the specific timing from the base station, the user equipment is unable to perform UL transmission. Similarly, although the base station indicates UL transmission to be performed at the specific timing via the UL grant, if the user equipment performs LBT at the specific timing and determines that a channel is in an occupied state, the user equipment is unable to perform UL transmission.

Figure 7:
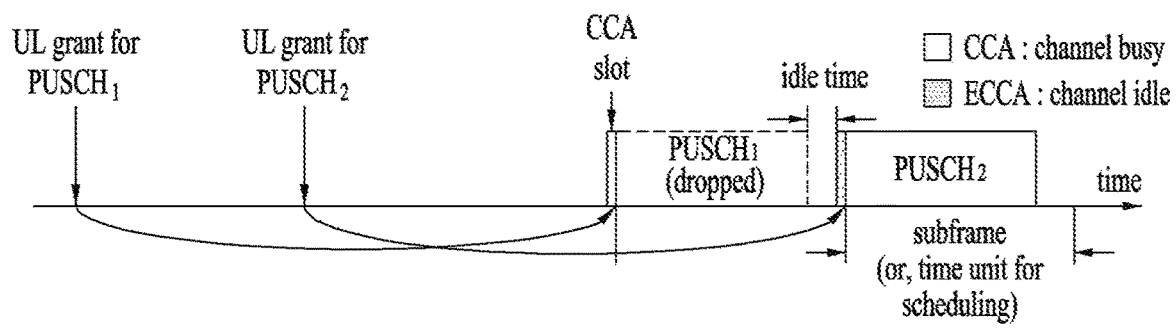
FIG. 7 is a diagram for an example of receiving a UL data transmission indication (UL grant), performing channel sensing according to the UL data transmission indication, and transmitting a UL data according to one embodiment of the present invention.

For example, FIG. 7 illustrates an LBT operation (hereinafter, UL LBT) for performing UL transmission of a user equipment when the user equipment applies FBE scheme as the LBT operation. Referring to FIG. 7, although a user equipment receives a UL grant corresponding to PUSCH1 from a base station, since a channel is determined as an occupied state (e.g., CCA: channel busy) according to a CCA result of UL LBT which is performed before UL transmission is performed, transmission is not performed. In particular, in order for a user equipment to perform UL transmission in LAA system, it is necessary for the user equipment to receive a UL grant from a base station and secure a channel using an LBT operation at UL transmission timing indicated by the UL grant. As a result, a problem of lowering a channel occupancy probability according to UL LBT may occur compared to an LBT operation in DL.

In order to solve the problem, when a transmitting node (e.g., a UE) receives a control signal (e.g., UL grant) granting data transmission from a control node (e.g., base station) and then the transmitting node is able to perform data transmission at specific timing (promised with the control node in advance) in a wireless communication system (e.g., LAA system) consisting of nodes performing LBT-based signal transmission, the present invention proposes an LBT operation capable of increasing a channel occupancy probability of the transmitting node. In the following, for example, although an operation in LTE system is explained to explain an operation of the present invention, the operation of the present invention can be extensively applied to a random wireless communication network consisting of nodes performing LBT-based transmission in an unlicensed band.

LBT Operation According to Control Signal

As mentioned earlier in the example of FIG. 7, if a UE applies the FBE scheme using a UL LBT operation in LAA system according to embodiments of the present invention, the UE may easily follow UL transmission timing according to a UL grant. Yet, since CCA is restricted to be performed at a prescribed period only, the UE may have a demerit in competing with a heterogeneous system (e.g., Wi-Fi, etc.) to preoccupy a channel. Hence, it may be preferable to introduce a back-off operation to a UL LBT operation for the LAA system. In the following, when a transmitting node receives a control signal (e.g., UL grant) from a control node (e.g., base station) and then performs data transmission at specific timing (or, specific time section) (promised with the control node in advance), the present invention proposes an LBT operation in consideration of the back-off operation.

LBT Operation Considering Whether or not Data Transmission is Successfully Performed LBT Operation Initialization In an LBT operation considering the back-off operation, if initialization of the LBT operation is not explicitly regulated, a transmitting node may operate without a procedure of initializing the LBT operation. In this case, when the LBT operation considering the back-off operation starts in a specific initial state, performs initial CCA if there is data to be transmitted, and sets a back-off counter according to whether a channel is occupied or unoccupied, the initialization of the LBT operation may correspond to one of operations described in the following.

(1) Operation of setting the LBT operation to an initial state corresponding to a state before the initial CCA is performed (2) Operation of setting a state corresponding to a state before a back-off counter value is determined (3) Operation of reconfiguring a back-off counter value (4) Operation of setting a back-off counter value to a specific value An operation of not initializing the LBT operation corresponds to an operation not considering a case that a transmitting node has data to be transmitted and it is not necessary for the transmitting node to transmit the data after specific timing. Yet, as mentioned earlier in the background related to the present invention, when the transmitting node transmits data at specific timing (or, time section) after a control signal indicating data transmission is received, if the transmitting node fails to transmit data at the specific timing (or, time section), the transmitting node may determine that there is no data to be transmitted until a next control signal is received. In the following, a method of initializing an LBT operation according to a control signal is proposed in consideration of the abovementioned characteristic.

A control node indicates whether or not an LBT operation is initialized to a transmitting node via a control signal (indicating data transmission).

A control node can inform a transmitting node of whether or not an LBT operation is initialized via a control signal indicating data transmission by including a separate indicator in the control signal. In this case, the transmitting node can initialize the LBT operation using one of methods described in the following.

(1) Initialize or maintain an LBT operation according to an LBT operation initialization indicator immediately after a control signal is received.

(2) Initialize or maintain an LBT operation according to an LBT operation initialization indicator immediately after a data corresponding to a control signal is transmitted.

For example, in LAA system according to the embodiment of the present invention, a base station can indicate whether or not an LBT operation is initialized by including an indicator of 1 bit in DCI which is transmitted for the purpose of a UL grant. In particular, the base station can indicate a UE not to initialize the LBT operation by setting the indicator to 0. The base station can indicate the UE to initialize the LBT operation by setting the indicator to 1. In this case, if the UE has data to be continuously transmitted after the current data is transmitted, the base station indicates the UE not to initialize the LBT operation. If the UE has no data to be continuously transmitted after the current data is transmitted, the base station can indicate the UE to initialize the LBT operation. As an additional operation of the abovementioned method, when a control node informs a transmitting node of whether or not an LBT operation is initialized via a control signal, the control signal can be separately configured irrespective of a control signal indicating data transmission. The control node can configure an LBT operation to be initialized after prescribed time is elapsed after data is transmitted in consideration of a case that the transmitting node fails to receive a control signal from the control node.

A transmitting node performs an LBT operation according to whether or not a control signal (indicating data transmission) transmitted by a control node is received.

An operation of initializing an LBT operation can also be utilized for a single control node to indicate a plurality of transmitting nodes to perform simultaneous transmission. For example, in the LAA system according to the embodiment of the present invention, a base station can indicate a plurality of UEs to perform UL transmission. In this case, when the base station indicates a plurality of the UEs to perform simultaneous transmission at specific timing, it may assume that a plurality of the UEs have the same section in which LBT is performed and interference nodes affecting a CCA (or, ECCA) operation are similar to each other. In this case, preferably, a probability of performing simultaneous transmission after a back-off counter is exhausted can be increased only when the same initial value of the back-off counter is configured. Hence, when the simultaneous transmission of a plurality of the transmitting nodes is supported, if a transmitting node receives a control signal indicating data transmission, an LBT operation can be more simply and efficiently initialized. When the transmitting node receives the control signal, the transmitting node can initialize the LBT operation using one of methods described in the following.

(1) (If the control signal is received after prescribed time is elapsed from the timing at which a previous control signal is received), the transmitting node initializes the LBT operation immediately after the control signal is received.

(2) The transmitting node initializes the LBT operation immediately after data corresponding to the control signal is transmitted.

As an additional operation of the abovementioned method, when a control node informs a transmitting node of whether or not an LBT operation is initialized via a control signal, the control signal can be separately configured irrespective of a control signal indicating data transmission.

Initialization of LBT operation when a transmitting node fails to perform data transmission at specific timing corresponding to a control signal (indicating the data transmission) transmitted by a control node As a further different method, it may consider an operation of initializing an LBT operation at the timing at which a transmitting node determines that there is no data to be transmitted. In this case, as mentioned earlier in the background related to the present invention, when the transmitting node transmits data at specific timing after a control signal indicating data transmission is received from a control node, if the transmitting node fails to transmit data indicated by the control signal at the transmission timing, the transmitting node may determine that there is no data to be transmitted by the transmitting node at the transmission timing and may be then able to initialize an LBT operation.

Or, as an additional operation of the abovementioned operation, if the transmitting node fails to receive a control signal indicating data transmission at the timing after the transmitting node fails to perform data transmission corresponding to the control signal or if prescribed time (configured by a control node) is elapsed after the data transmission is not performed, the transmitting node can initialize an LBT operation.

Incremental Counter-Based LBT Operation

In the following, a counter X is defined. When a transmitting node configures a value of the counter X by 0 and CCA is successfully performed in a specific time section (i.e., a channel is determined as in an unoccupied state), it may assume that an operation of increasing the value of the counter X by 1. In this case, a method of determining a maximum data transmission length using the value of the counter X is proposed.

A transmitting node increases the value of the counter X according to the success of CCA (or, ECCA) in a specific time section (e.g., TWCOUNT) (capable of being configured) before data transmission corresponding to a control signal (indicating data transmission) transmitted by a control node. If the value of the counter X becomes xi selected from the N number of candidates (i.e., $\{x0, x1, x2, \ldots, xN\}$) in a specific time section (e.g., TWTRIGGER) (capable of being configured) before data transmission, the transmitting node can transmit a signal (e.g., a reservation signal or data) during a transmission section COT(xi) (channel occupancy time) corresponding to the selected value.

In general, an LBT scheme considering a back-off operation manages a maximum value capable of configuring a value of a back-off counter by semi-statically configuring the maximum value. Yet, in case of performing UL transmission in the LAA system according to the embodiment of the preset invention, a UE may fail to transmit data in response to a UL grant indicated by a base station. In this case, when the UE performs data transmission in response to a next UL grant, it is difficult for the UE to obtain a compensation for the time for which the UE waited for the previous data transmission while performing a back-off operation. A method for mitigating the abovementioned problem is described in the following. Although a transmitting node fails to perform data transmission in a current scheduling unit, if the transmitting node has data to be transmitted in a next scheduling unit, the transmitting node can transmit a reservation signal. Yet, if the reservation signal is transmitted for a long time, the reservation signal may act as interference to other nodes and may cause a negative effect to overall system performance. Hence, the embodiment of the present invention proposes a method that a transmitting node defines a counter X counting the number of CCA successes while waiting for transmission timing and permits signal transmission including reservation signals as much as a transmission section corresponding to a value from the timing at which the counter X is configured by the value corresponding to one of N number of predetermined candidate values rather than a method that a value of a back-off counter is set and the value is exhausted. According to the method proposed by the embodiment of the present invention, although the transmitting node fails to perform data transmission at specific timing, the counter X increase as much as waiting time and it is able to occupy a transmission section for a long time. An initial CCA step can be included at the timing before counting of the counter X is performed. In particular, if a channel state is determined as an occupied state via the initial CCA, a counting operation of the counter X can be performed. In this case, if data transmission is successfully performed or a value greater than a maximum value among the values of the N number of candidates is counted, it may return to a state of preparing the initial CCA.

Figure 8:
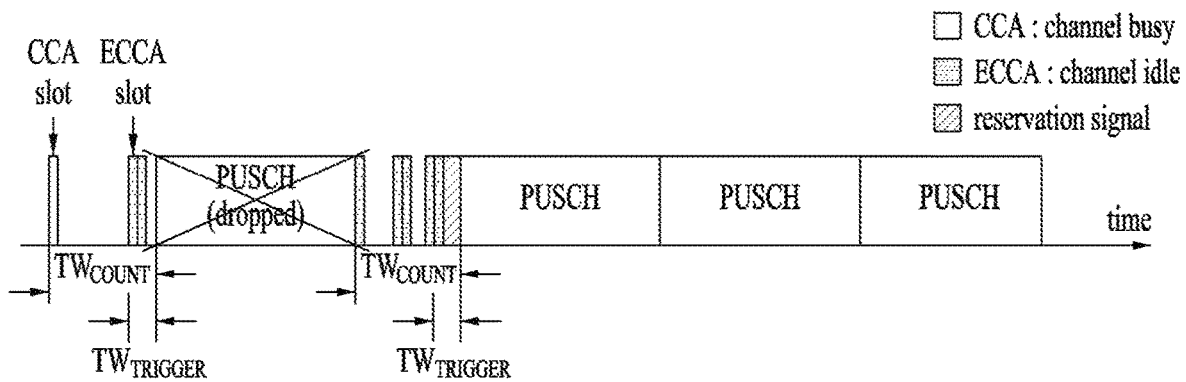
FIG. 8 is a diagram for an example of performing back-off counter-based channel sensing and transmitting UL data according to the back-off counter-based channel sensing in accordance with one embodiment of the present invention.

FIG. 8 shows an example of the aforementioned method considering the LBE scheme of Europe regulation. First of all, a random number is respectively selected from [1, 4] and [1, 10] sections in consideration of a case that q corresponds to 4 and 10 for two candidate groups (x0, x1) for the counter X. In FIG. 8, assume that the x0 and the x1 correspond to 3 and 7, respectively. In this case, COT corresponding to q=4 in LBE is about 1.6 ms. In LTE system, PUSCH can be transmitted in 1 SF. COT corresponding to q=10 is about 4 ms. In this case, PUSCH can be transmitted in 4 SFs. According to the example shown in FIG. 8, since the number of successes of ECCA does not have a value corresponding to the x0 or the x1 in the time section represented by TWTRIGGER in a first subframe, PUSCH is not transmitted. Since the number of successes of ECCA corresponding to the x1 is counted in a next TWTRIGGER, a part of reservation signals is transmitted and PUSCH is transmitted in 3 SFs.

Decremental Counter-Based Operation

As a variation of the incremental counter-based operation, a transmitting node configures a back-off counter value for COTX at specific transmission timing and decreases the back-off counter value according to the CCA (or ECCA) success in a specific time section (e.g., TWCOUNT) (capable of being configured in advance) before data transmission corresponding to a control signal (indicating data transmission) transmitted by a control node. If the back-off counter value does not become 0 in a specific time section (e.g., TWTRIGGER) (capable of being configured in advance) before the data transmission, the transmitting node configures a back-off counter value for COTY COTX) at the next transmission timing and repeats the abovementioned operation. In particular, if the back-off counter is not exhausted in a specific time section, the transmitting node changes a COT configuration and may be able to configure a back-off counter for new COT.

Configuring a Section in which LBT is Performed According to a Control Signal

Figure 9:
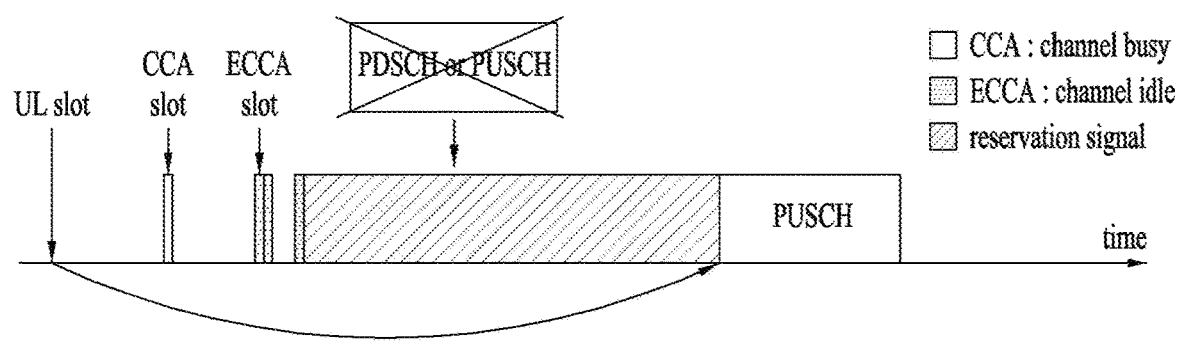
FIG. 9 is a diagram for an example of receiving a UL data transmission indication (UL grant), transmitting a reservation signal according to the UL data transmission indication, and transmitting a UL data according to one embodiment of the present invention.
Figure 10:
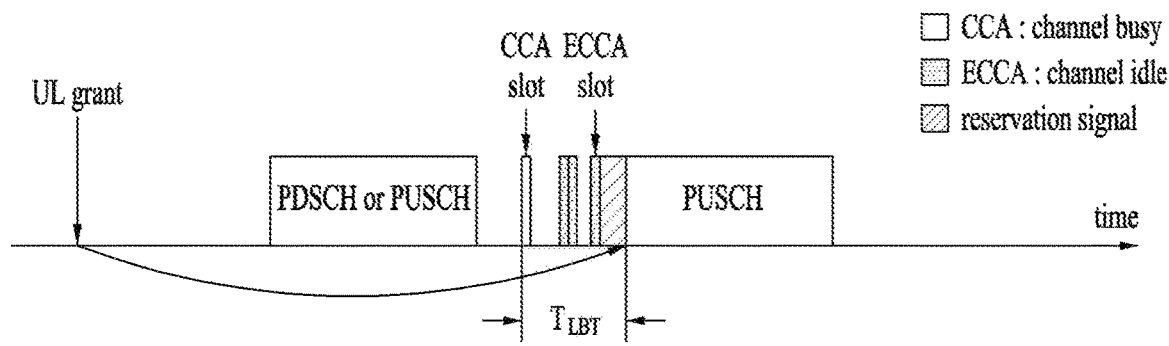
FIG. 10 is a diagram for an example of receiving a UL data transmission indication (UL grant), transmitting a reservation signal according to the UL data transmission indication, and transmitting a UL data according to one embodiment of the present invention.

In an LBT operation considering a back-off operation, if a transmitting node has data to be transmitted, the transmitting node performs initial CCA or ECCA to transmit the data when a channel is in an unoccupied state. According to the present invention, when the transmitting node transmits data at specific timing (or a time section) after a control signal indicating data transmission is received, the transmitting node performs an LBT operation from the timing at which the control signal is received to occupy a channel. In this case, if the transmitting node exhausts a back-off before the transmission timing indicated by the control signal, the transmitting node can transmit a reservation signal until the transmission timing. In this case, if the LBT operation of the transmitting node is permitted immediately after the timing at which the control signal indicating the data transmission is received, a problem that a control node is unable to utilize resources between the timing at which the control signal is received and the transmission timing of the transmitting node for a different purpose (e.g., transmission of a different transmitting node) may occur. For example, if an LBT operation of a UE is permitted immediately after a UL grant is received in LAA system according to the embodiment of the present invention, as shown in FIG. 9, a section in which a reservation signal is transmitted is too much extended. As a result, the section may steal PDSCH transmission of a base station or a PUSCH transmission occasion (of a different UE) or act as interference.

In order to solve the abovementioned problem, the embodiment of the present invention proposes a method for a control node to configure a section in which an LBT operation of a transmitting node is performed via a control signal. In the following description, the LBT operation may correspond to one selected from the group consisting of defer time, initial CCA, ECCA, and reservation signal transmission.

Method for a Control Node to Inform a Transmitting Node of a Section in which LBT is Performed by Including the Section in Control Signal Information (Indicating Data Transmission)

A control node includes an indicator capable of indicating N (≥1) number of states in control signal information indicating data transmission of a transmitting node, configures information on a time length indicated by each of the N number of states, and informs the transmitting node of the information in advance. If the transmitting node receives a control signal and a time length set to a state indicated by the indicator included in the control signal corresponds to TLBT, the TLBT can be applied using a method among the two methods described in the following.

(1) The transmitting node performs an LBT operation from TLBT time to data transmission timing on the basis of the data transmission timing.

(2) The transmitting node performs an LBT operation from TLBT time to data transmission timing on the basis of the timing at which a control signal is received.

As an example of the above mentioned operation, in the LAA system, a control node indicates a value among the $2^K$ number of candidate values for the entire TLBT via a K-bit field included in a UL grant and a transmitting node can perform an LBT operation prior to the TLBT time on the basis of transmission timing according to the UL grant.

As an additional operation, when the control node informs the transmitting node of the section in which LBT is performed via a control signal, the control signal can be separately configured irrespective of a control signal indicating data transmission. Or, if it is not necessary for the control node to dynamically change the TLBT, the control node may semi-statically set a value of the TLBT to the transmitting node. For example, the control node may semi-statically set a value of the TLBT to the transmitting node via a higher layer signal such as RRC in LTE system according to the embodiment of the present invention.

Method for a control node to inform a transmitting node of a section in which a reservation signal is transmitted or information on whether or not a reservation signal is transmitted by including the section or the information in control signal information (indicating data transmission).

The aforementioned method of signaling the section in which LBT is performed may set a limit on implementing a section in which LBT is performed by a transmitting node. In order to mitigate the limit on implementing the LBT of the transmitting node, the control node can configure a section in which a reservation signal is transmitted or information on whether or not a reservation is transmitted via control signal information indicating the data transmission. A method of indicating the section in which the reservation signal is transmitted can be defined in a manner of being similar to the method of indicating TLBT in the method of signaling the section in which LBT is performed. In particular, the control node includes an indicator capable of indicating N (≥1) number of states in control signal information indicating data transmission of the transmitting node, configures information on a time length indicated by each of the N number of states, and informs the transmitting node of the information in advance. If the transmitting node receives a control signal and a time length set to a state indicated by the indicator included in the control signal corresponds to TRESERVE, the TRESERVE can be applied using a method among the two methods described in the following.

(1) The transmitting node can transmit a reservation signal from TRESERVE time to data transmission timing on the basis of the data transmission timing.

(2) The transmitting node can transmit a reservation signal from TRESERVE time to data transmission timing on the basis of the timing at which a control signal is received.

In this case, although the transmitting node has a restriction that the transmitting node is unable to transmit a reservation signal at the outside of the section in which a reservation signal is transmitted, whether to transmit a reservation signal in the section in which the reservation signal is transmitted can be determined according to the implementation of the transmitting node. As an additional operation, when the control node informs the transmitting node of the section in which the reservation signal is transmitted via a control signal, the control signal can be separately configured irrespective of a control signal indicating data transmission. Or, if it is not necessary for the control node to dynamically change the TRESERVE, the control node may semi-statically set a value of the TRESERVE to the transmitting node. For example, the control node may semi-statically set a value of the TRESERVE to the transmitting node via a higher layer signal such as RRC in LIE system according to the embodiment of the present invention. Or, the TRESERVE can be configured by a fixed length without separate signaling.

Or, the control node can indicate whether or not a reservation signal of the transmitting node is transmitted via a control signal indicating the data transmission. If the control signal indicates the transmitting node not to transmit a reservation signal, the transmitting node may perform an LBT operation similar to FBE. For example, when UL LBT start timing of UEs are identically configured and an LBT operation is configured to be initialized whenever a UL grant is received in the LAA system according to the embodiment of the present invention, if the control node configures the transmitting node not to transmit a reservation signal, each of the UEs can perform data transmission only when initial CCA is successfully performed (e.g., initialized to a state before the first CA) or ECCA is successfully performed until the transmission timing indicated by the control node (e.g., a back-off counter is initialized by a positive integer greater than 0). As an additional operation, the control node can inform the transmitting node of an indicator indicating an LBT scheme to be applied among a plurality of LBT schemes via a control signal indicating data transmission or a separate control signal. For example, a base station can indicate a UE to perform an LBT operation among a back-off based LBT operation and a FBE operation via a UL grant.

Figure 11:
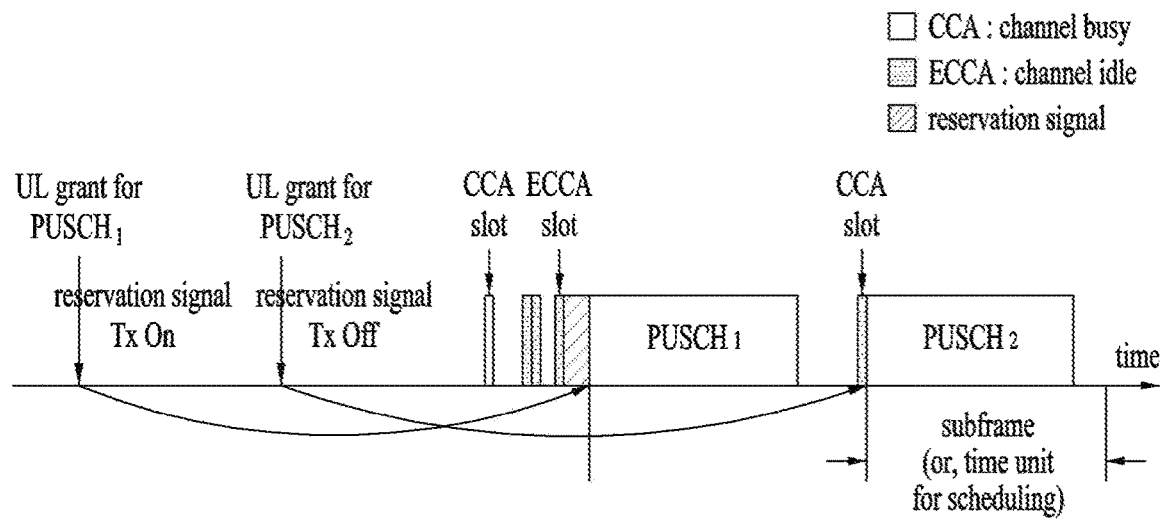
FIG. 11 is a diagram for an example of receiving a UL data transmission indication (UL grant), transmitting a reservation signal according to whether or not the reservation signal included in the UL data transmission indication is indicated, and transmitting a UL data according to one embodiment of the present invention.

FIG. 11 shows an operation of a transmitting node when the transmitting node receives a control signal including a UL grant and information on whether or not a reservation signal is transmitted. Since a UL grant for PUSCH1 indicates transmission of a reservation signal, the transmitting node performs CCA (ECCA) and transmits the reservation signal until UL transmission is performed. On the contrary, since a UL grant for PUSCH2 indicates a reservation signal not to be transmitted. Hence, the transmitting node does not transmit a reservation signal and may be able to transmit the PUSCH2 after initial CCA is successfully performed.

Configuring LBT-Supporting (Aiding) Resource in Data Transmission Section

As mentioned earlier in the background related to the present invention, when a transmitting node is able to perform signal transmission at specific timing (or time section) after a control signal indicating data transmission is received from a control node, if there exist small transmitting nodes less interfered with each other, it may be preferable to permit simultaneous transmission to the nodes in the aspect of resource utilization. Meanwhile, according to the Europe regulation, a back-off based LBT operation (i.e., LBE) is configured to change a maximum signal transmission length (e.g., including a reservation signal) in consideration of a case that the amount of data to be transmitted by the transmitting node is large. Yet, similar to the LBE scheme, if a data transmission length longer than a scheduling unit of the control node is permitted to a specific transmitting node, a different transmitting node performs CCA (or ECCA) at next scheduling timing and determines that a channel is in an occupied state. As a result, it is difficult for the control node to indicate simultaneous transmission to a plurality of transmitting nodes.

Figure 12:
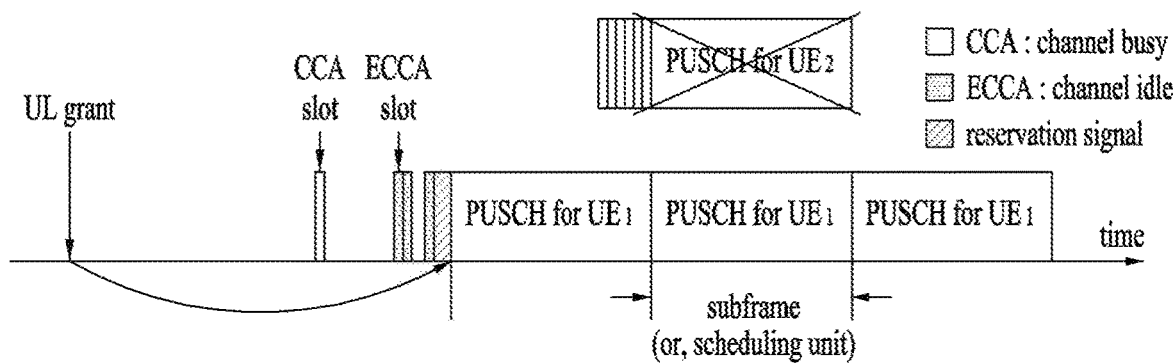
FIG. 12 is a diagram for an example of a collision occurred between a UL data transmitted by a specific transmitting node and a UL data transmitted by a different transmission mode in a plurality of scheduling units.

FIG. 12 shows a case that a result of performing LBT for transmitting PUSCH of a UE2 is determined as a channel occupied state due to PUSCH transmitted by a UE1 when a section in which the PUSCH of the UE1 is transmitted is configured by 3 SFs in LAA system according to the embodiment of the present invention. In order to solve the abovementioned problem, a method of configuring a resource (hereinafter, LBT-aiding resource) for aiding LBT performed by a different transmitting node in a data transmission section of a transmitting node is proposed.

When a data transmission section is configured by a plurality of scheduling units, a method of configuring a frequency resource (e.g., subcarrier) not performing signal transmission during a prescribed time section in each of a plurality of the scheduling units (In this case, data can be transmitted in an allocated frequency resource rather than the configured frequency resource).

Figure 13:
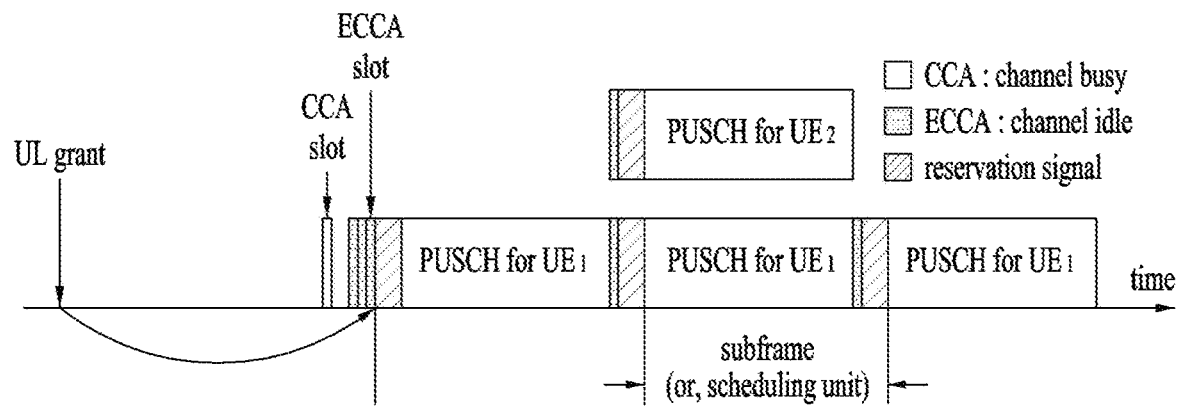
FIG. 13 is a diagram for an example of a UL data transmitted by a specific transmitting node and a UL data transmitted by a different transmission mode in a plurality of scheduling units according to one embodiment of the present invention.

As a simple method of not interrupting an LBT operation between transmitting nodes, which are indicated by a control node to transmit data in each scheduling unit, the control node configures a data transmission length of each of the transmitting nodes to be less than a scheduling unit and sets time for performing CCA between scheduling units. For example, a CCA gap is configured between SFs in the LAA system according to the embodiment of the present invention. By doing so, it may be able to control an LBT operation between transmitting nodes performing UL transmission not to be interrupted using the same control node. FIG. 13 shows a method of configuring UEs to perform an LBT operation during prescribed time before PUSCH is transmitted and a method of configuring a PUSCH transmission length to be less than an SF corresponding to a scheduling unit all the time.

Yet, in case of performing an operation according to the configuration shown in FIG. 13, it is necessary to perform an LBT operation in every scheduling unit (e.g., SF) within a data transmission section of a transmitting node (e.g., UE1). As a result, the transmitting node may have a demerit in competing with transmitting nodes of a different radio network to occupy a channel. Hence, when a data transmission section of a transmitting node is configured by a plurality of scheduling units on the basis of a scheduling unit of a control node, the present invention proposes a method of setting a frequency resource (e.g., subcarrier) not performing signal transmission during a prescribed time section to each of the scheduling units in the data transmission section of the transmitting node. In this case, the control node can inform the transmitting node of a frequency axis position of the frequency resource and a time axis position of a scheduling unit in advance. The transmitting node can perform data transmission in a region rather than the frequency resource in the data transmission section of the transmitting node. In order to perform simultaneous transmission, transmitting nodes perform CCA on the configured frequency resource only to occupy a channel or exhaust a back-off counter, and the like.

Figure 14:
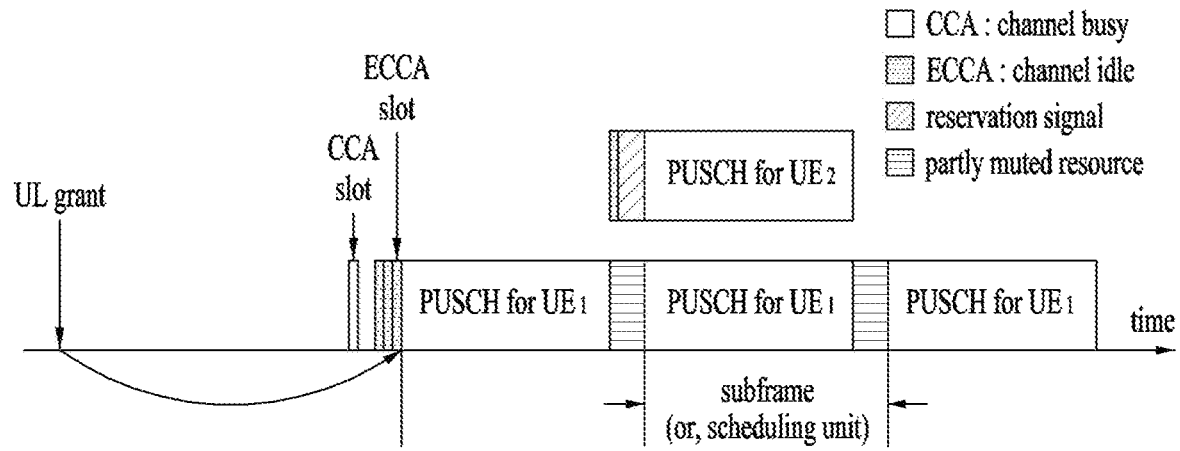
FIG. 14 is a diagram for an example of a UL data transmitted by a specific transmitting node and a UL data transmitted by a different transmission mode in a plurality of scheduling units according to one embodiment of the present invention.

FIG. 14 shows a case of setting a frequency resource not performing signal transmission to the latter part of each SF in the LAA system according to the embodiment of the present invention. In this case, a UE1 can perform data transmission in the remaining frequency resources except the frequency resource among the entire system band and a UE2 may attempt to occupy a channel by performing CCA on the frequency resource.

The abovementioned operation may have an effect of blocking an LBT operation to transmitting nodes to which simultaneous transmission is not permitted while the LBT operation is guaranteed to transmitting nodes to which simultaneous transmission is permitted.

When a data transmission section is configured by a plurality of scheduling units, a method of transmitting a known signal (or, a signal known to a plurality of transmitting nodes capable of performing simultaneous transmission) configured by a control node during a prescribed time section in each scheduling unit.

The abovementioned proposal has a constraint that a frequency resource becoming a target of CCA is restricted to transmitting nodes intending to perform simultaneous transmission. The aforementioned CCA operation may correspond to an operation not permitted in a certain region (e.g., Europe). Hence, as a further different method, when a data transmission section of a transmitting node is configured by a plurality of scheduling units on the basis of a scheduling unit of a control node, the present invention proposes a method for the transmitting node to transmit a known signal configured by the control node during a prescribed time section in each scheduling unit of the data transmission section of the transmitting node. In this case, transmitting nodes capable of performing simultaneous transmission can receive information on a signal known to the transmitting nodes from the control node. When CCA is performed, the transmitting nodes can determine a CCA result after cancellation is performed on the known signal.

Figure 15:
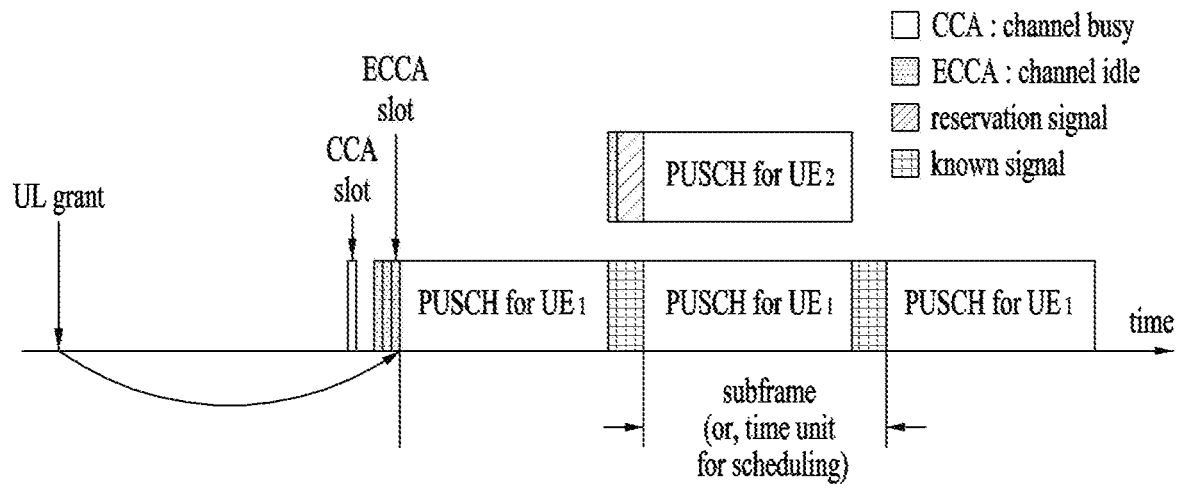
FIG. 15 is a diagram for an example of a UL data transmitted by a specific transmitting node and a UL data transmitted by a different transmission mode in a plurality of scheduling units according to one embodiment of the present invention.

FIG. 15 shows a case of transmitting a known signal capable of being cancelled by UEs belonging to the same cell to a latter part of each SF in LAA system according to the embodiment of the present invention. The known signal can be designed in a form of a sequence including such a factor as a cell ID, an operator ID, an SF index, and the like.

Figure 16:
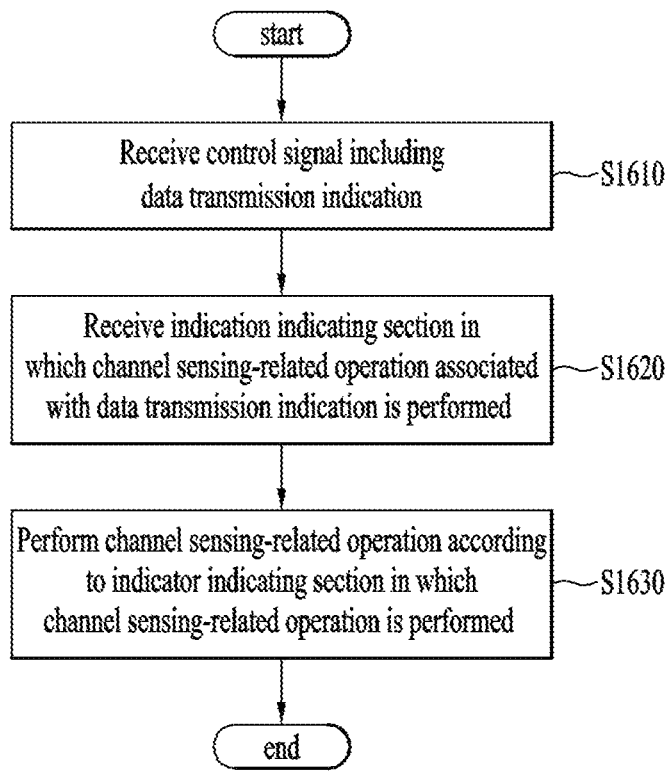
FIG. 16 is a flowchart for an operation according to an embodiment of the present invention.

FIG. 16 is a flowchart for an operation according to an embodiment of the present invention. FIG. 16 shows a method of performing channel sensing in an unlicensed band in a wireless communication system. The method can be performed by a transmitting node performing the channel sensing.

The transmitting node can receive a control signal including data transmission indication from a control node [S1610]. The transmitting node can receive an indicator indicating a section in which a channel sensing-related operation associated with the data transmission indication is performed from the control node [S1620]. The transmitting node can perform the channel sensing-related operation during a length of time corresponding to the indicator before data transmission start timing according to the data transmission indication or perform the channel sensing-related operation between the length of time corresponding to the indicator and the data transmission start timing according to the data transmission indication on the basis of the timing at which the control signal is received [S1630]. If the transmitting node randomly performs the channel sensing-related operation after the control signal including the data transmission indication is received, the operation may affect channel sensing or channel occupation of a different transmitting node. Hence, the timing at which the channel sensing-related operation is performed is restricted by the control node in the step S1630.

The channel sensing-related operation can include at least one selected from the group consisting of an operation of performing a back-off counter-based initial CCA (clear channel assessment), an operation of performing a back-off counter-based ECCA (extended CCA), and an operation of transmitting a reservation signal.

And, the indicator indicating the section in which the channel sensing-related operation is performed can be included in the control signal. Or, the indicator indicating the section in which the channel sensing-related operation is performed can be received via higher layer signaling.

The transmitting node can receive an indication indicating whether or not a reservation signal is transmitted from the control node. And, the transmitting node can receive a second indicator indicating a section in which transmission of a reservation signal is permitted from the control node.

The section in which transmission of a reservation signal is permitted may correspond to a length of time corresponding to the second indicator before data transmission start timing according to the data transmission indication or a section between the length of time corresponding to the second indicator and the data transmission start timing according to the data transmission indication on the basis of the timing at which the control signal is received.

If the data transmission indication indicates data transmission transmitted during a plurality of scheduling units, each of a plurality of the scheduling units can include a time frequency resource not performing the data transmission. The time frequency resource not performing the data transmission can be used for a channel sensing-related operation of other nodes.

If the data transmission indication indicates data transmission transmitted during a plurality of scheduling units, each of a plurality of the scheduling units can include a time resource in which the transmitting node configured by the control node transmits a known signal. The time resource in which the transmitting node transmits the known signal can be used for a channel sensing-related operation of other nodes.

And, the control signal can further include information indicating whether or not the channel sensing-related operation is initialized. The information indicating whether or not the channel sensing-related operation is initialized can be used for performing simultaneous transmission with other UEs.

If it fails to perform the data transmission indicated by the data transmission indication according to a result of the channel sensing, the transmitting node can initialize the channel sensing-related operation.

In the foregoing description, embodiments of the present invention have been briefly explained with reference to FIG. 16. An embodiment related to FIG. 16 can alternatively or additionally include at least a part of the aforementioned embodiments.

Figure 17:
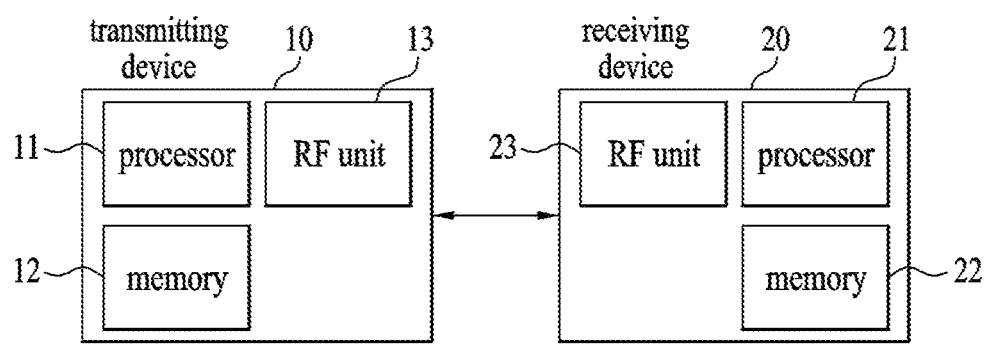
FIG. 17 is a block diagram of a device for implementing embodiment(s) of the present invention.

FIG. 17 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using fit or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:
1. A method for a transmitting node to perform channel sensing in an unlicensed band in a wireless communication system, the method comprising:
 receiving a control signal indicating a data transmission on a plurality of scheduling units from a control node, wherein each of the plurality of scheduling units comprises a time resource for a known signal;
 receiving information on a length of section in which the channel sensing for the data transmission is performed from the control node, wherein the information on the length of section is configured to a K bits field indicating one of $2^K$ length candidates;
 performing the channel sensing during the length of section just before the data transmission; and
 transmitting the data transmission and the known signal on the plurality of scheduling units,
 wherein the time resources for the known signal are configured during a predetermined time section per each of the plurality of scheduling units, and
 wherein the known signal is designed in a form of a sequence including a cell identifier (ID), an operator ID, and a subframe index.

2. The method of claim 1, wherein the channel sensing comprises at least one of an operation of performing a back-off counter value-based initial clear channel assessment (CCA), an operation of performing a back-off counter value-based extended CCA (ECCA), or an operation of transmitting a reservation signal.

3. The method of claim 1, wherein the information on the length of section is included in the control signal.

4. The method of claim 1, wherein the information on the length of section is received by higher layer signaling.

5. The method of claim 1, further comprising receiving an indication indicating whether or not a reservation signal is transmitted from the control node.

6. The method of claim 1, further comprising receiving an indicator indicating a section in which transmission of a reservation signal is permitted from the control node,
 wherein the section in which the transmission of the reservation signal is permitted includes a length of time corresponding to the indicator just before a start timing of the data transmission according to the control signal.

7. The method of claim 6, wherein the length of time corresponding to the indicator corresponds to a fixed length of time.

8. The method of claim 1, wherein when the control signal indicates transmitting the data transmission during a plurality of scheduling units, each of the plurality of scheduling units comprises a time frequency resource not performing the data transmission.

9. The method of claim 8, wherein the time frequency resource not performing the data transmission is used for a channel sensing of other nodes.

10. The method of claim 1, wherein the time resource in which the transmitting node transmits the known signal is used for a channel sensing of other nodes.

11. The method of claim 1, wherein the control signal further comprises information indicating whether or not the channel sensing is initialized.

12. The method of claim 11, wherein the information indicating whether or not the channel sensing is initialized is used for simultaneous transmission with other UEs.

13. A transmitting node configured to perform channel sensing in an unlicensed band in a wireless communication system, the transmitting node comprising:

an radio frequency (RF) transceiver; and a processor that controls the RF transceiver to:

receive a control signal indicating a data transmission from a control node, on a plurality of scheduling units from a control node, wherein each of the plurality of scheduling units comprises a time resource for a known signal, receive information on a length of section in which the channel sensing for the data transmission is performed from the control node, wherein the information on the length of section k configured to a K bits field indicating one of $2^K$ length candidates, perform the channel sensing during the length of section just before the data transmission, and transmit the data transmission and the known signal on the plurality of scheduling units, wherein the time resources for the known signal are configured during a predetermined time section per each of the plurality of scheduling units, and wherein the known signal is designed in a form of a sequence including a cell identifier (ID), an operator ID, and a subframe index.

* * * * *